Aug. 19, 1969  W. J. SIEGAL  3,461,687
QUICK CONNECT FLEXIBLE DRIVE
Filed May 28, 1968
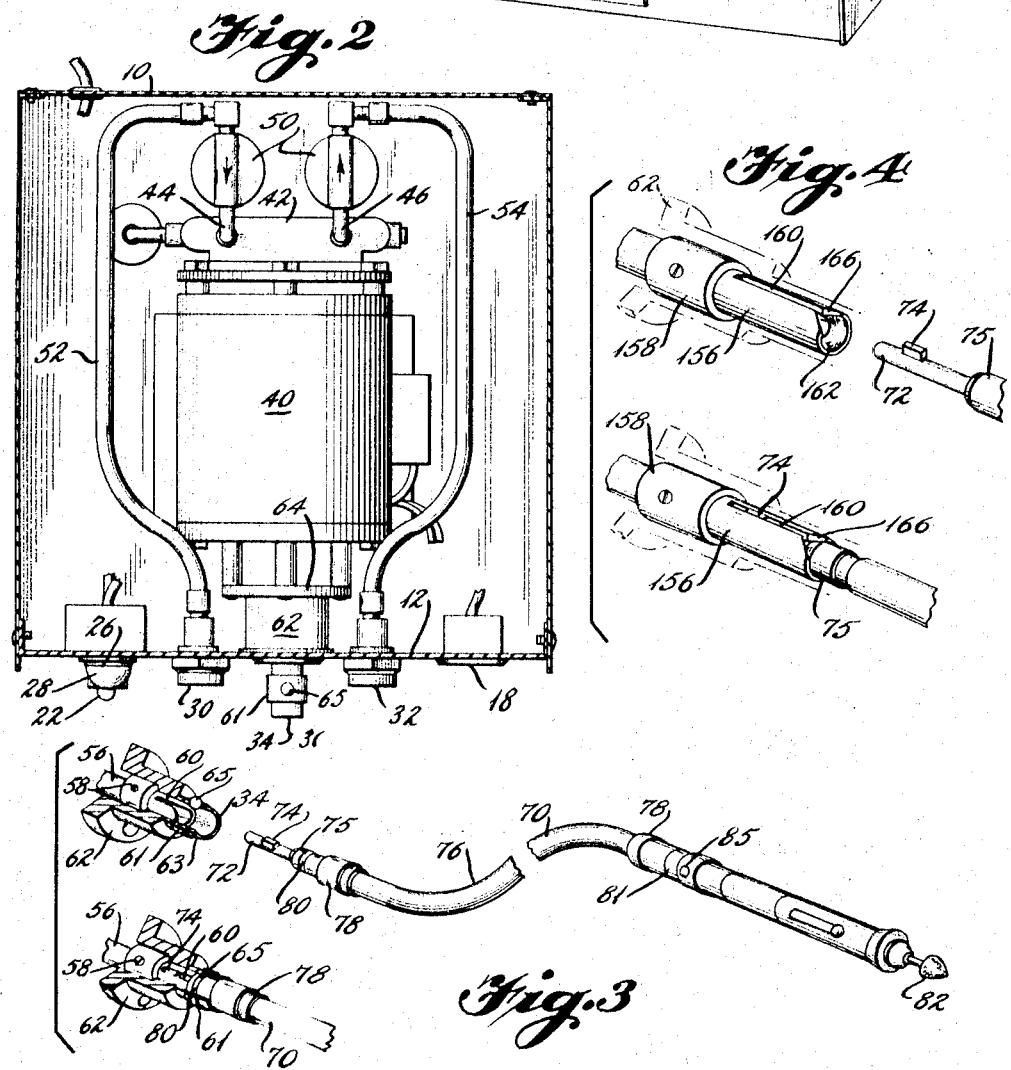

United States Patent Office
3,461,687
Patented Aug. 19, 1969

3,461,687
QUICK CONNECT FLEXIBLE DRIVE
William Jordan Siegal, 9337 Fraser St.,
Silver Spring, Md. 20910
Continuation-in-part of application Ser. No. 539,168,
Mar. 31, 1966. This application May 28, 1968, Ser.
No. 732,665
Int. Cl. F16c 1/08, 1/06
U.S. Cl. 64—2                                   1 Claim

ABSTRACT OF THE DISCLOSURE

The invention relates to a double male ended quick convert flexible drive shaft structure particularly adapted for use with an electronic equipment repair and maintenance unit. The female connection member is of special construction which permits the flexible drive to be connected and disconnected while the driving motor is in operation.

---

This invention is a continuation-in-part of application Ser. No. 539,168, filed Mar. 31, 1966, now Patent No. 3,411,594, for Maintenance Unit. That invention relates to a combination unit particularly adapted for the repair and reconstruction of electronic circuits and assemblies. The present invention relates to a double male ended flexible drive shaft particularly adapted for use with the maintenance unit.

The tendency more and more towards micro miniaturization in electronic gear, i.e. printed circuit boards replace hand wired circuit, integrated circuits replace circuit boards, along with encapsulation of the entire circuit and high density packaging have added to the immeasurable difficulties of repair and maintenance of the electronic gear. The problems of repair and maintenance are further compounded by the broad variety of equipment types in widespread use and the minimal degree of manufacturing uniformity by the vast number of suppliers of electronic gear.

Serious efforts on the part of suppliers to insure high product quality and products of a maintenance free character are accompanied often by virtual refusal to face the reality of equipment failure. Frequently, the most complex and expensive piece of equipment must be shut down for failure of a single connection or of one inexpensive component. The truth of the matter is that maintenance and repair must be provided for; the repair technician must have tools commensurate with the complexity of modern electronic gear.

A virtually self-contained versatile electronic repair unit which a skilled mechanic can employ as the equipment basis for making repairs on even the most complex electrical circuitry is disclosed in copending application Ser. No. 539,168. A single compact housing contains components which make available to the repair technician the electrical power, mechanical drive power, vacuum and pressure by quick connection coupling on a panel face. The present invention provides a double male ended flexible drive shaft adapted to be the mechanical drive take-off from the maintenance unit.

For further understanding of the invention, reference is now made to the attached drawing wherein:

FIG. 1 shows the housing and front panel of the repair and maintenance unit;

FIG. 2 illustrates a motor pump forming part of the present invention and is taken along lines 2—2 of FIG. 1;

FIG. 3 is a diagrammatic view showing the mechanical drive and its connection to the front end of the motor pump, shown assembled and disassembled; and FIG. 4 is a diagrammatic view similar to FIG. 3 of an improved drive connection.

Referring now to FIG. 1 of the drawing, it may be seen that the maintenance power center or unit 10, is provided with a panel face 12 containing thereon electrical outlets 14, 16, 18 and on-off switch 20, a pedal switch 22, the foot operated pedal 24 being plugged into or attached to an electrical outlet (not shown) in the side or rear of center 10. Additionally present are a warning light 26 to show when center 10 is powered, and a rotatable knob 28 for a fuse to allow ready replacement thereof. Operation of the foregoing components are self-explanatory. Also, since the electrical connection inside center 10 associated therewith are of the sort which would suggest themselves to those skilled in the art, they will not therefore be described in detail. However, their presence is important to center 10 by themselves and in association with pressure tap 30, vacuum tap 32, and mechanical drive tap 34 which make up the balance of the service available on panel 12 of maintenance center 10. Other services, e.g. of electric power, can be provided with a larger unit.

As shown in FIG. 1, the fittings for pressure and vacuum taps 30, 32 are of a quick connect type so that repair function accessories may be readily attached thereto as needed. As will be explained in more detail hereafter, the fitting structure of mechanical drive tap 34 is also adapted for quick connect and disconnect.

An important aspect of the maintenance unit is that the pressure, vacuum and mechanical drive connections are all taken from the same power source in uncomplicated fashion. All three have operational characteristics related closely to the overall repair and maintenance function of center 10. Referring now to FIGS. 2 and 3 of the drawing, it may be seen that a motor 40, preferably of a constant speed type, directly drives a centrifugal pump or blower 42. The vacuum side 44 and the pressure side 46 of blower 42 pass through filter muffler 50 via lines 52, 54 to the pressure and vacuum taps respectively on the panel face 12. The drive shaft 56 of motor 40 is extended on the side opposite blower 42 past the motor housing so that it may be provided with the female half of a quick connect structure of the nature illustrated in FIG. 3 or FIG. 4.

Directly mounted on the end of drive shaft 56 is a slot adapter 58, the slot being shown at 60. Surrounding the slot adapter 58, axially spaced therefrom, is a shroud 62 peripherally bolted or otherwise secured to a matching face 64 machined on the motor housing. On the end portion 63 of shroud 62 is provided a ball 65 loaded by a C-spring 61. Desirably, the entire end portion 63 extends from panel face 12.

As shown in FIG. 4, a preferred slot adapter 158 which fits closely inside shroud 62 has a relatively thick wall 156. In addition, adapter 158 is provided with a beveled face 162 which flares outwardly from the central aperture 164 of adapter 158 and with a V-shaped notch 166 at the entrance to the slot 160 of the adapter.

As has already been indicated, motor 40 should be a constant speed type, e.g., synchronous. As synchronous motor provides a fixed (low) speed (high torque) mechanical drive for take off at tap 34. A synchronous motor provides optimum suction and pressure characteristics. Indeed, such motors are conventionally employed for driving blowers of the nature illustrated in the drawing (the blower itself being of conventional construction). By way of specific example, a one-tenth horsepower synchronous motor will provide for an adequate mechanical drive, while drawing a vacuum of 15 inches mercury and providing air at 10 p.s.i., with somewhat less vacuum and pressure when both suction and pressure are desired simultaneously. The unit will pump about half a cubic foot of air per minute under a reasonable suction and mechanical drive load on the motor.

The mechanical drive attachment for use with mechanical drive tap 34 is a special double male quick connect flexible drive shaft assembly 70. The prong ends of assembly 70 are identical; each formed with an upstanding key 74 and a base hub 75. The sheath 76 surrounding the usual coiled spring drive shaft terminates in a metal sleeve 78 having a groove 80 formed adjacent the end thereof. When prong 72 is engaged in slot adapter 58 with key 74 in the slot 60, the sleeve 78 penetrates end portion 63 of shroud 62 deeply enough for spring loaded ball 64 to lock, so to speak, in groove 80. The flexible drive assembly 70 is then in connected driven engagement with the motor shaft 56. The other end of the flexible drive assembly 70 may be connected through a female spindle 81 (having a like spring-loaded ball 85 and a slot adapter) to a tool, suitably a little grinding wheel 82.

Slot adapter 158 may be employed in lieu of adapter 58 both at the motor connection and in female spindle 81.

It should be noted that the double male connection described above connects the flexible shaft through prongs 72 in driving relation to tool 82, in a manner which permits some necessary axial movement or play in the shaft and prong ends. However, the tool 82 is divorced from this play, receiving only torque. The tool is rotatably locked into the spindle 81, the spindle is attached to the stationary sheath 76 and sheath 76 is attached to the motor housing at machined face 64. Slight axial movement of prongs 72 and key 74 along slot adapter 58 or 158 has no effect on tool 82, nor conversely does the pressure applied by the operator on tool 82 effect the flexible drive connections.

Slot adapted 158 has certain advantages over the structure of slot adapter 58. Motor 40 should not be running when flexible drive assembly 70 is connected thereto by insertion of prong 72 into slot adapter 58. However, use of slot adapter 158 permits connection to be made when motor 40 is running. The V-shaped notch 166 and beveled face 162 create sufficient engagement with key 74 for the key to slip into the slot 160 despite the rotation of adapter 158. The relatively thick wall 156 largely encompasses prong 74. Similarly, when the spindle 81 contains a slot adapter 158, it too may be engaged and disengaged while flexible shaft assembly 70 is being driven. Although the ability to connect a flexible drive assembly to an already running motor may seem of little import, the ability to make a tool change on the fly is desirable. Where the motor is part of a power center 10 and supplies auxiliary needs, such as for example air for cooling the workpiece, continued operation of motor 40 during a tool change may be important.

The reason for fuse knob 28 and foot pedal 24 should now become readily apparent. They are associated with the mechanical drive, the foot pedal to leave free both hands of the operator for manipulation of the work piece, the rotating tool, electrical tools, etc., and the fuse knob 28 so that blowing a fuse (as for example by stopping the driven tool through an excessive torque load) need not hold up work longer than is required to insert a replacement fuse directly from the panel face 12.

Important to the concept of power center 10 as a unitary whole is the possibility for mechanically abrading away matter such as encapsulating resin and underlying that the metal of a defective connection, while air cooling the region being abraded (by an air line connection to pressure tap 32) and, at the same time, the dust so generated is removed (by a suction line connection to vacuum tap 34).

It should be appreciated that the above description of the invention has been made in terms of preferred exemplary construction and uses therefor, and that changes and other uses as will suggest themselves to those skilled in the art are contemplated within the scope of the hereto appended claims.

What is claimed is:

1. A flexible drive assembly having a drive connection therefor which comprises a sheathed flexible shaft terminating at each end in a prong, the prong being formed with an upstanding key integral therewith; a hub formed at the base of said prong, said hub being disposed in bearing engagement with the terminus of said sheath; and a groove formed in said sheath adjacent the terminus thereof whereby engagement of the keyed prong in a slotted female member may be maintained by a detent resting in said groove, the slotted female member adapted for engagement with a prong end of said assembly being characterized by a side wall of sufficient thickness to essentially encompass the key on the prong end within the slot of the female member, a notch in the side wall at the entrance to the slot therein and a beveled face on the side wall of the entrance to the central aperture of the slotted female member.

References Cited

UNITED STATES PATENTS

| | | | |
|---|---|---|---|
| 1,391,092 | 9/1921 | Beach | 64—4 |
| 1,409,207 | 3/1922 | Van Osdel | 64—4 |
| 1,479,302 | 1/1924 | Sones | 64—4 |
| 1,575,307 | 3/1926 | Bachmann | 64—4 |
| 1,943,980 | 1/1934 | Mall | 64—4 |
| 2,536,017 | 1/1951 | Bamberger | 64—4 |

HALL C. COE, Primary Examiner

U.S. Cl. X.R.

64—4